United States Patent [19]
Lee

[11] Patent Number: 5,917,626
[45] Date of Patent: Jun. 29, 1999

[54] TUNABLE FILTER FOR USE IN WAVELENGTH DIVISION MULTIPLEXER AND DEMULTIPLEXER

[75] Inventor: Ho-Shang Lee, El Sobrante, Calif.

[73] Assignee: Dicon Fiberotics, Inc., Berkeley, Calif.

[21] Appl. No.: 08/800,661

[22] Filed: Feb. 14, 1997

[51] Int. Cl.$^6$ .................................................. H04J 14/02
[52] U.S. Cl. .............................. 359/131; 359/124; 385/24
[58] Field of Search .................................. 359/124, 127, 359/130, 131, 129; 388/24, 33, 78

[56] References Cited

U.S. PATENT DOCUMENTS

| 5,361,155 | 11/1994 | Chiaroni et al. | 359/131 |
| 5,629,995 | 5/1997 | Duck et al. | 385/24 |
| 5,737,104 | 4/1998 | Lee et al. | 359/124 |

FOREIGN PATENT DOCUMENTS

| 0066213 | 4/1985 | Japan | 359/131 |

OTHER PUBLICATIONS

Selfoc® Product Guide of NSG America, Inc.; Somerset, NJ 08873.

Hideki Ishio et al., "Review and Status of Wavelength–Division–Multiplexing Technology and its Application", *Journal of Lightwave Technology*, vol. LT–2, No. 4, Aug. 1984, pp. 448–463.

*Primary Examiner*—Kinfe-Michael Negash
*Attorney, Agent, or Firm*—Majestic, Parsons, Siebert & Hsue P.C.

[57] ABSTRACT

The characteristic pass and rejection bands of an interference filter may be altered by changing the angle of incidence of light upon the filter. If the input beam is first collimated by a GRIN lens before it is transmitted to the interference filter, the characteristic wavelength bands of the filter can be altered by altering the distance of the input beam from the axis of the GRIN lens. Therefore, ferrules having imbedded therein input/output optical fibers may be provided to vary the distance of the input and output optical paths from the axis of the GRIN lens so that the desired spectral components in these paths are rejected or passed by the filter for performing multiplexing and demultiplexing.

21 Claims, 7 Drawing Sheets

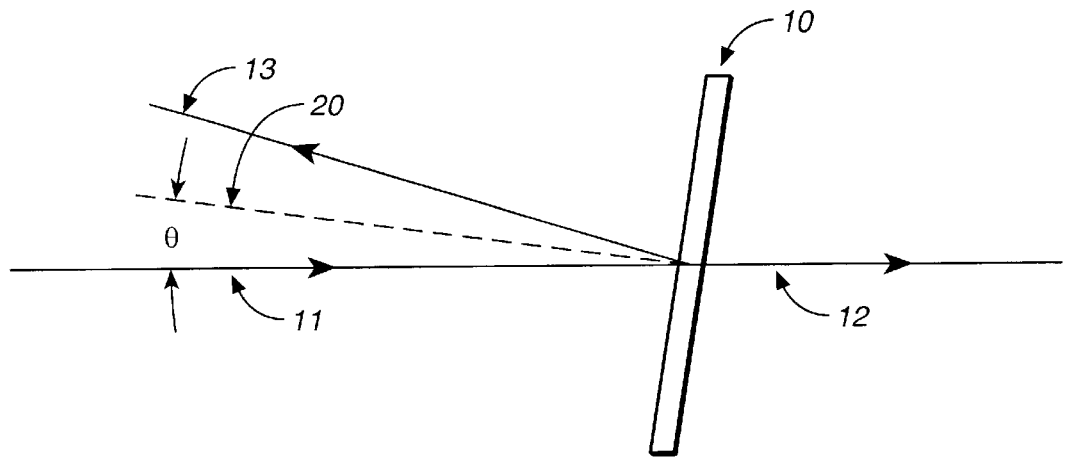
$\lambda_\theta = \lambda_0(1-a\sin^2\theta)^{1/2}$
where
- $\theta$ = angle of incidence
- $\lambda_\theta$ = center wavelength at angle of incidence $\theta$
- $\lambda_0$ = center wavelength at 0° angle of incidence
- $a$ = coefficient related to the effective refractive index of thin films
FIG._1
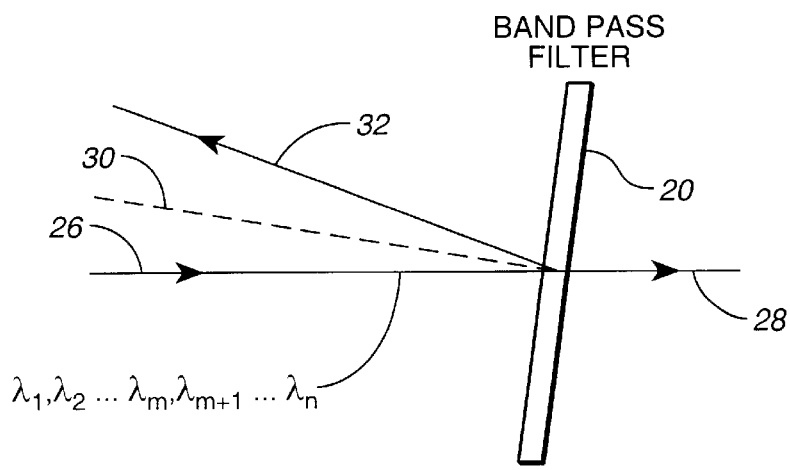
FIG._2A

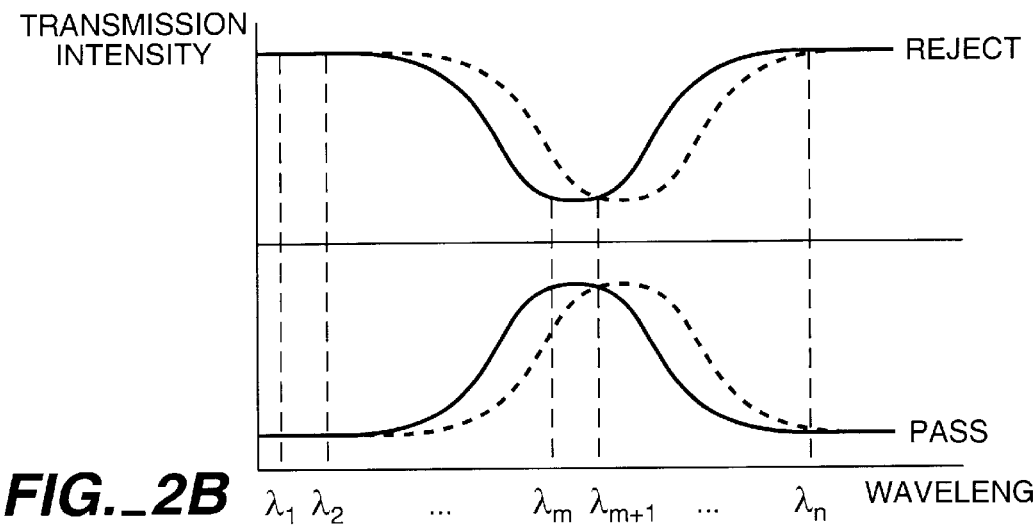
FIG._2B
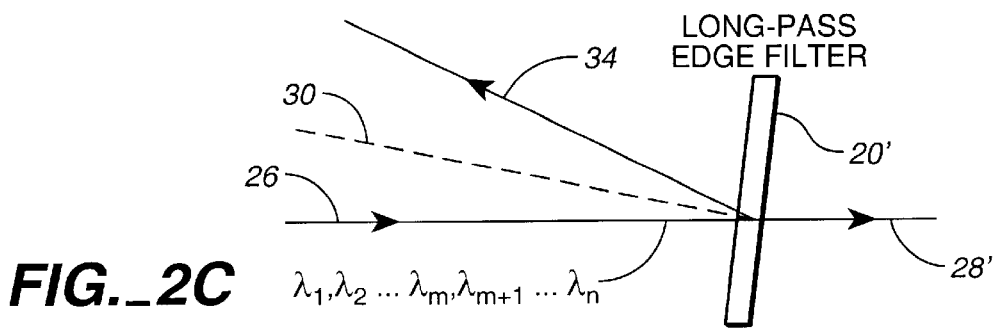
FIG._2C
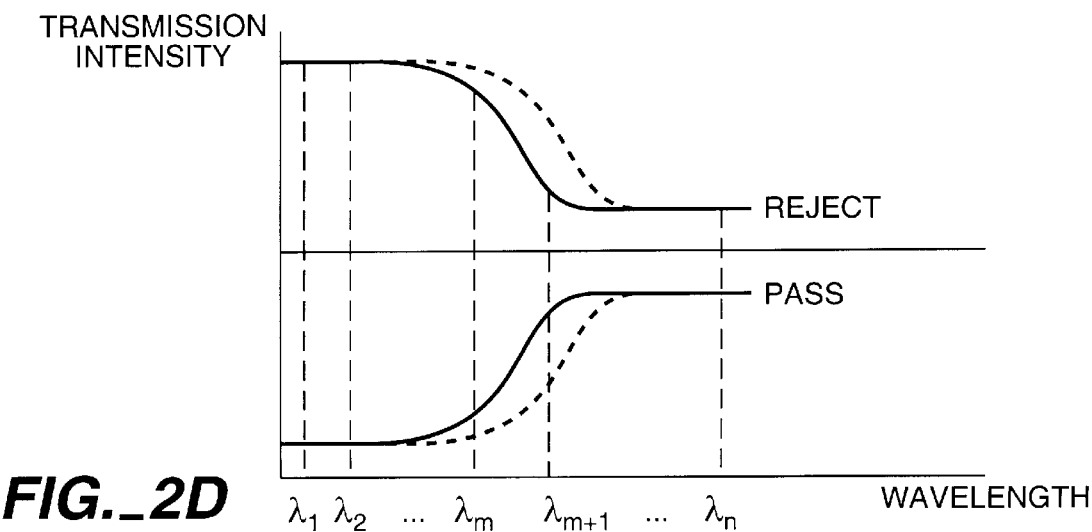
FIG._2D

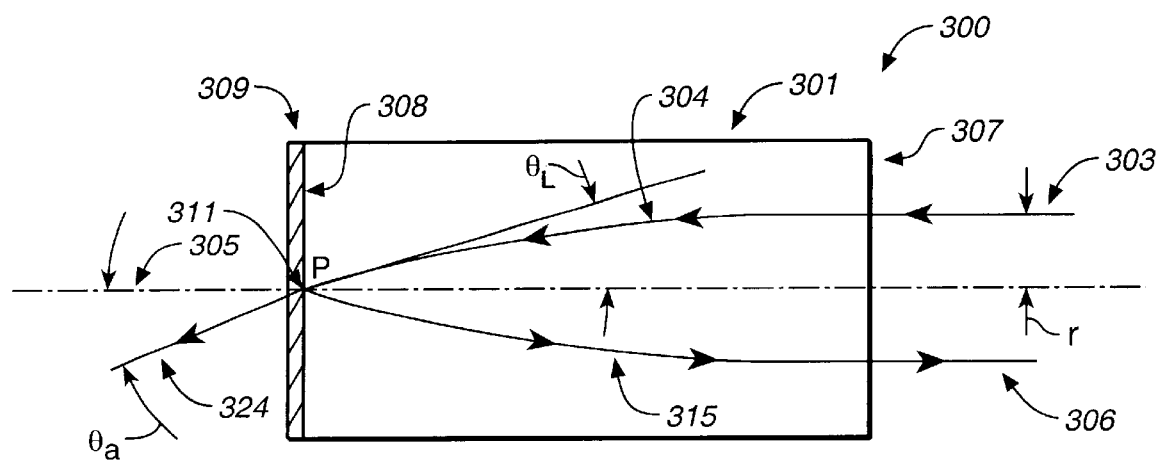
FIG._3
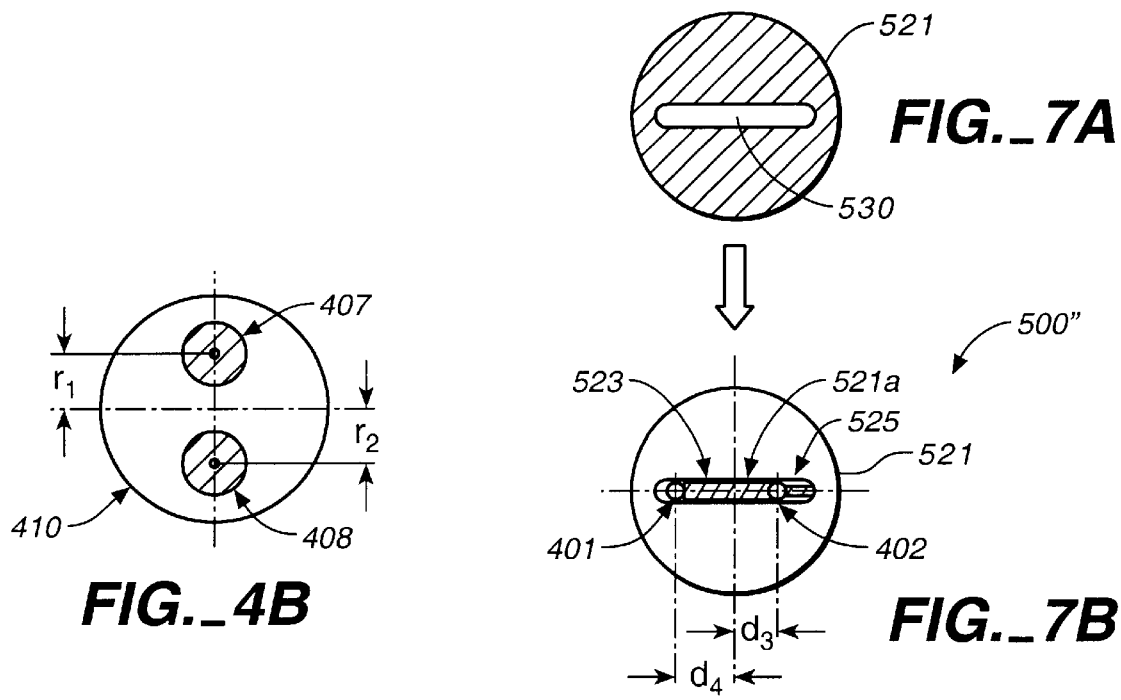
FIG._4B
FIG._7A
FIG._7B

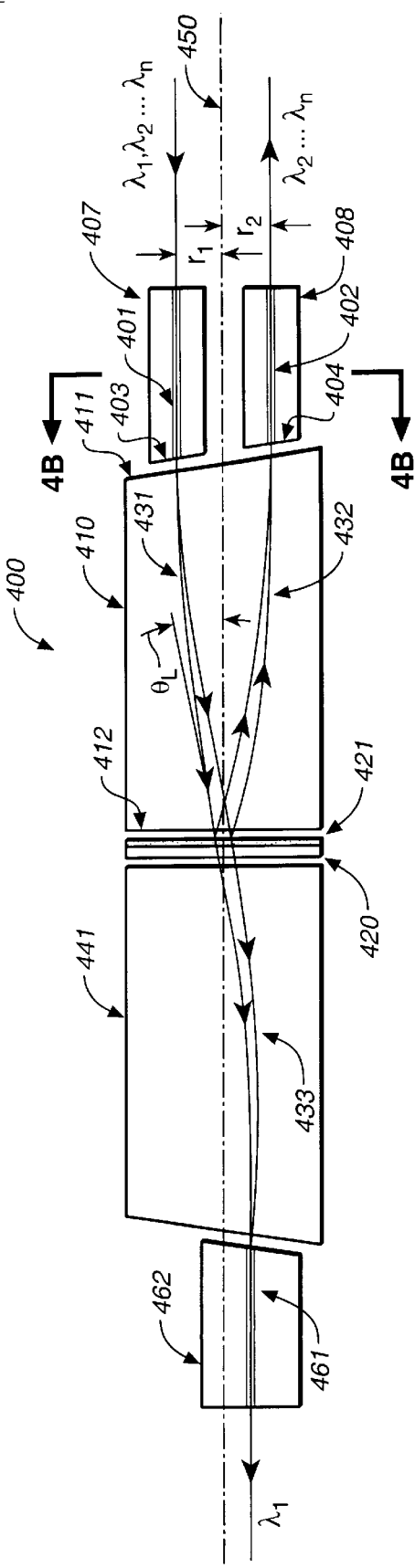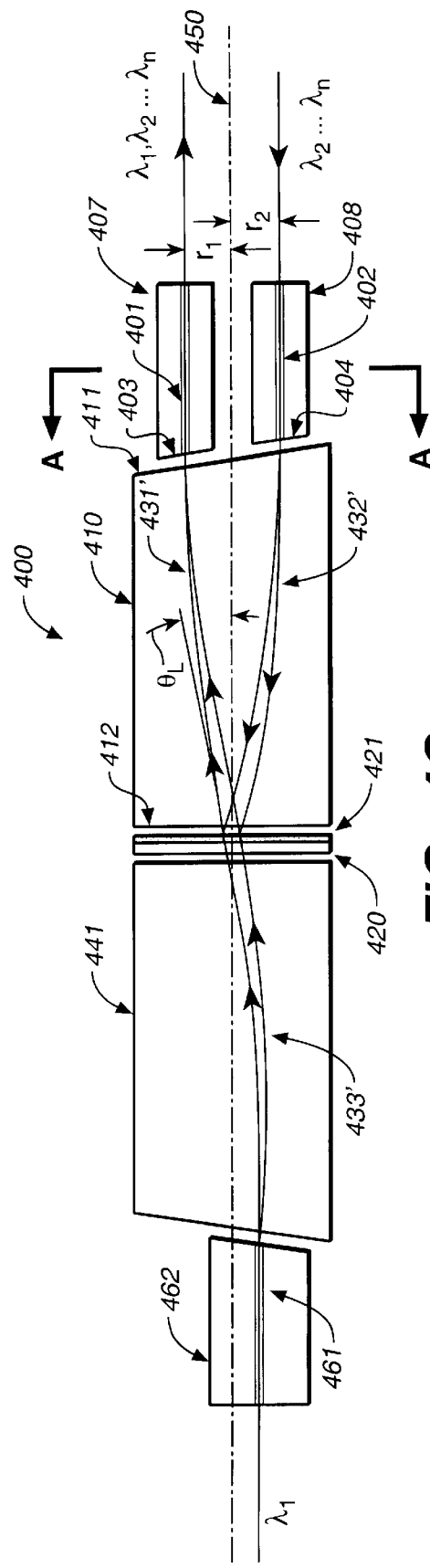

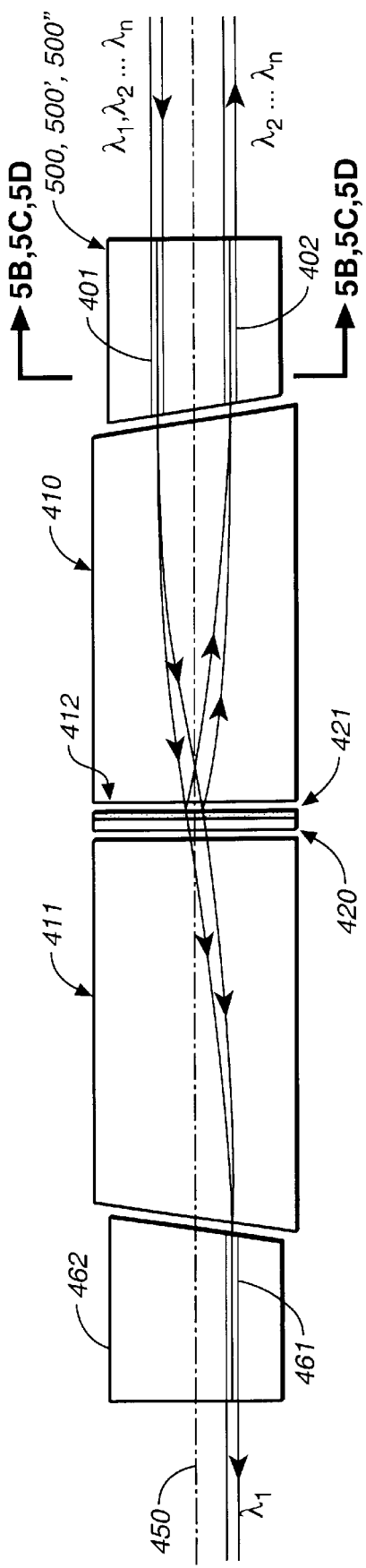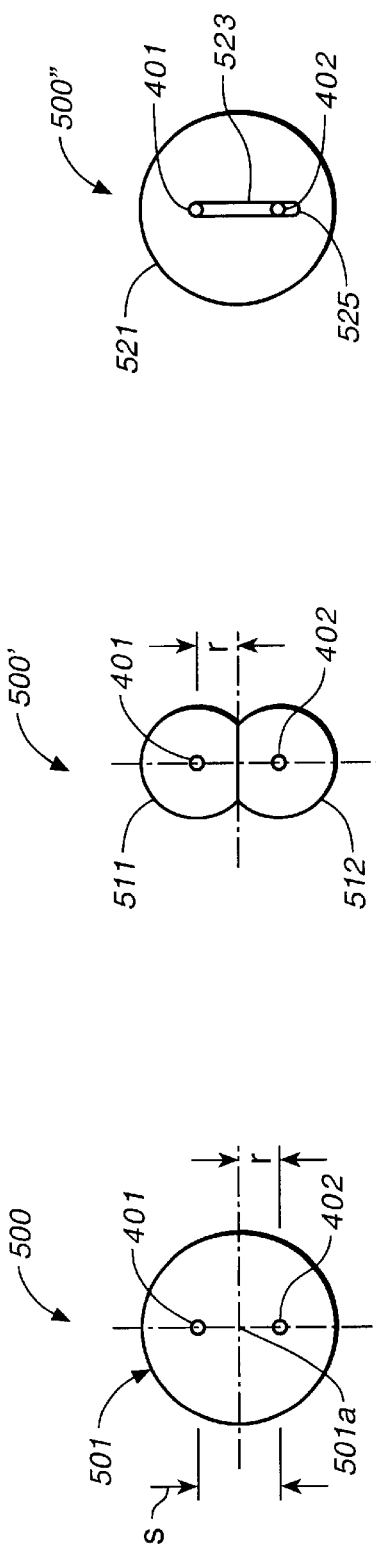
*FIG._5A*
*FIG._5B*
*FIG._5C*
*FIG._5D*

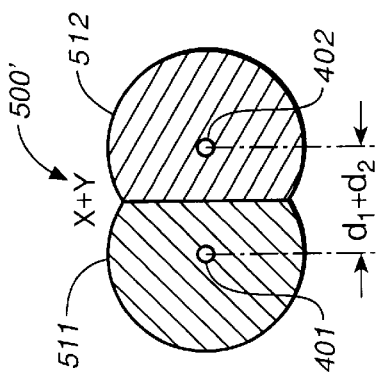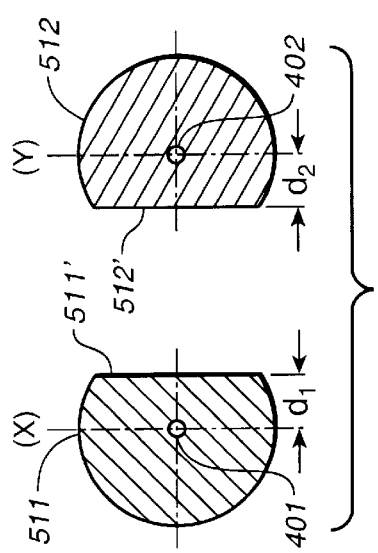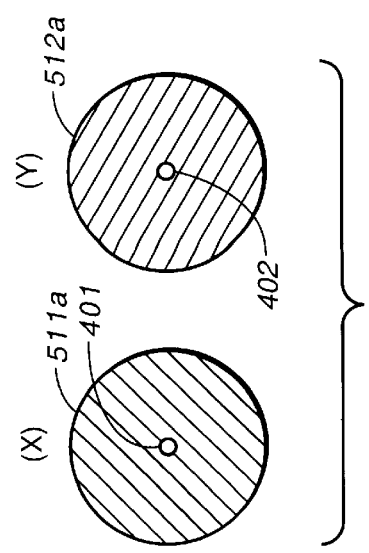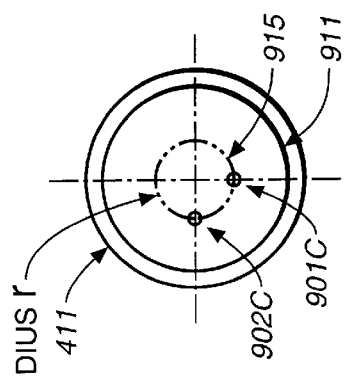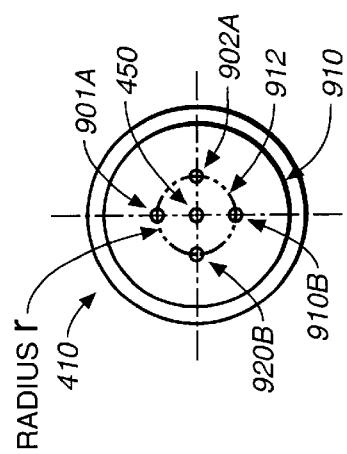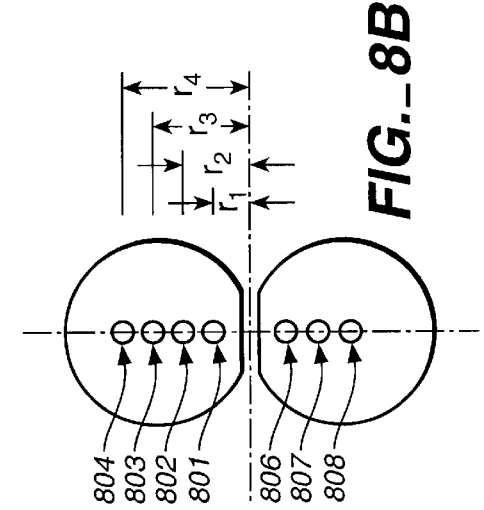

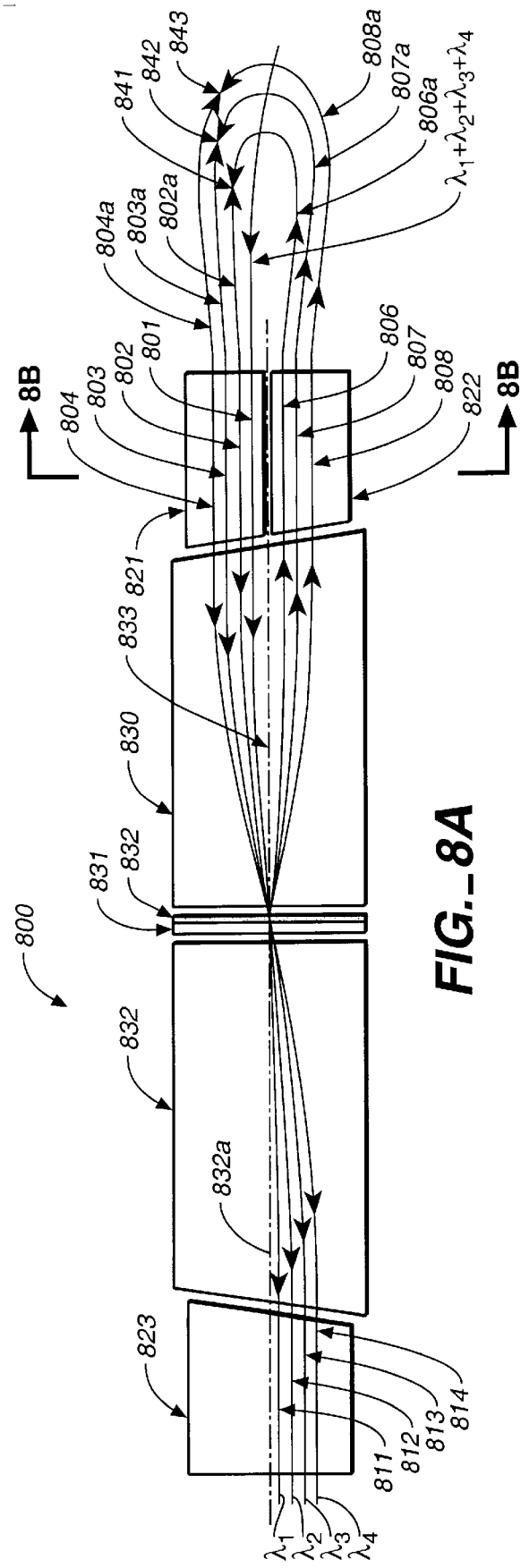
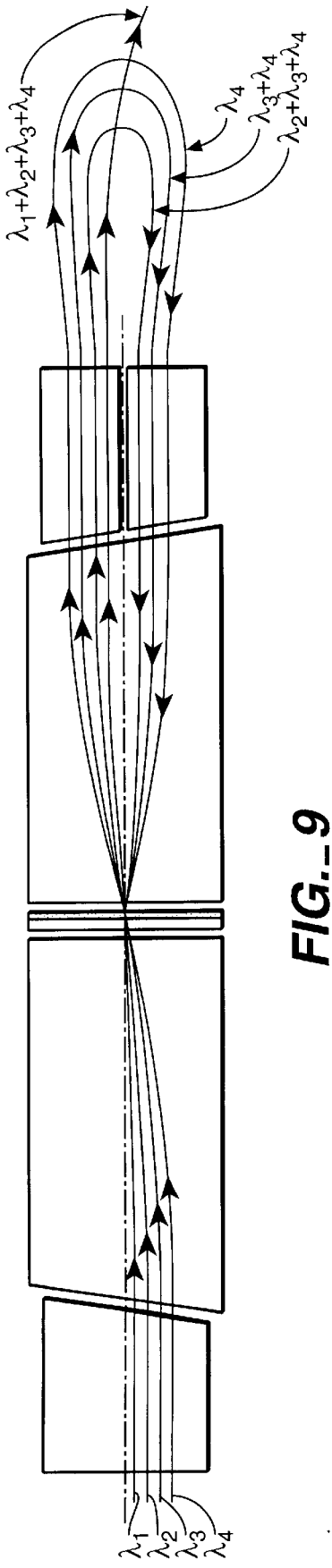
FIG._8A
FIG._9

TUNABLE FILTER FOR USE IN WAVELENGTH DIVISION MULTIPLEXER AND DEMULTIPLEXER

BACKGROUND OF THE INVENTION

This invention relates to optical communication equipment and in particular to a tunable filter useful in wavelength division multiplexing and demultiplexing.

In recent years, optical fiber technology for telecommunication has progressed rapidly. While the theoretical transmission capacity of the single mode optical fiber has been recognized in the industry as extremely high from the day such fiber was introduced, much of the capacity has not been utilized. For the increasing demand for bandwidth, such as in the transmission of video images and graphics, much attention has been directed lately toward the maximal utilization of the bandwidth of the single mode fiber. Wavelength division multiplexing (WDM) is one of most capable schemes of maximizing bandwidth utilization of single mode fiber.

In a WDM system, multiple optical signal sources emitting spectral components at different wavelengths, $\lambda_1$, $\lambda_2, \ldots, \lambda_n$, are coupled into the same single mode fiber by means of a multiplexer into a composite optical signal. After the composite signal with spectral components of different wavelengths is transmitted through the fiber to a desired destination, the multiple spectral components at their respective multiple wavelengths must then be decoupled by means of a demultiplexer into separate optical channels, each spectral component at its wavelength being carried by a different channel to a detector. While the spectral components are said to have their corresponding wavelengths, it is understood that each of the spectral components may comprise light having a small spread (e.g. 0.01%) of wavelengths about a peak characteristic wavelength value.

The channel spacing of a few nanometers or less of WDM system is presently commercially available. Industry standard groups, such as the International Telecommunication Union has specified center wavelengths and channel spacings for the WDM system. Currently, 32 channel WDM system is on the way of commercialization. At the heart of this dense WDM networks are the optical multiplexer and demultiplexer. Many component technologies, including dielectric thin-film coatings, diffraction gratings, embedded fiber grating and planar waveguide phase arrays, have been used to produce multiplexers and demultiplexers. Thin film technology appears best suited to meet the low loss, high isolation objectives for the demultiplexer. However, the control of the center wavelength accuracy of the bandpass of the thin film filter is practically difficult. It is therefore desirable to provide alternative optical components for use in high-reliability WDM multiplexers and demultiplexers.

SUMMARY OF THE INVENTION

This invention is based on the observation that, by controlling the distance between an input optical path and the axis of a GRIN lens and using the lens to transmit the beam to an interference filter, the pass and rejection bands of the filter can be easily tuned to form a tunable filter useful in high-accuracy WDM multiplexers and demultiplexers.

One aspect of the invention is directed towards an adjustable optical filter device, comprising a filter having a characteristic property that the filter passes spectral components within the characteristic wavelength band and reflects spectral components outside said characteristic wavelength band, wherein said characteristic wavelength band varies with the angle of incidence of light to the normal direction to the filter. The filter device further comprises a first GRIN lens having an axis and means for directing a first input optical signal having one or more spectral components along a first input optical path substantially parallel to said axis and incident on the first GRIN lens at a distance from the axis, said lens transmitting the first input optical signal towards the filter, said directing means also selecting said distance so that at least a first spectral component in the first input optical signal transmitted by the lens is passed or reflected by the filter.

Another aspect of the invention is directed towards a method for optical filtering, comprising the steps of providing a filter having a characteristic property that the filter passes incident spectral components within a characteristic wavelength band and reflects incident spectral components outside said characteristic wavelength band, wherein said characteristic wavelength band varies with the angle of incidence of said incident spectral components to the normal direction to the filter; and a GRIN lens having an axis. The method further comprises directing an input optical signal having at least one spectral component along an input optical path substantially parallel to said axis incident on the GRIN lens at a distance from the axis so that said lens transmits the input optical signal to the filter, said directing step also selecting said distance so that said at least one spectral component is passed or reflected by the filter.

BRIEF DESCRIPTION OF THE DRAWINGS

FIG. 1 is a schematic view of a thin film interference filter useful for illustrating the invention.

FIG. 2A is a simplified schematic view of the interference filter of FIG. 1 where the filter is a bandpass filter.

FIG. 2B is a graphical illustration of the bandpass characteristics of the filter for the light that passes through the filter as well as that of the lights rejected or reflected by the filter of FIG. 2A.

FIG. 2C is a schematic view of the filter of FIG. 1 where the filter is an edge filter.

FIG. 2D is a graphical illustration of the characteristic property of the edge filter of FIG. 2C.

FIG. 3 is a schematic diagram of an interference filter and a GRIN lens used together as a tunable filter to illustrate the invention.

FIG. 4A is a cross-sectional view of a tunable filter device in a demultiplexer for decoupling different spectral components after the components have been transmitted to a desired destination to illustrate an embodiment of the invention.

FIG. 4B is a cross-sectional view of the device of FIG. 4A along the line 4B—4B in FIG. 4A.

FIG. 4C is a cross-sectional view of a tunable filter device having the same structure as the device of FIG. 4A, but where the device is being used for coupling two or more spectral components in a multiplexer to illustrate an embodiment of the invention.

FIG. 5A is a cross-sectional view of a tunable filter device for use in multiplexing and demultiplexing to illustrate the preferred embodiment of the invention.

FIGS. 5B, 5C, 5D are cross-sectional views of the device of FIG. 5A along the line (5B, 5C, 5D)—(5B, 5C, 5D) in FIG. 5A to illustrate different embodiments for constructing the ferrule of FIG. 5A.

FIGS. 6A, 6B, 6C are cross-sectional views of two ferrules each having an optical fiber embedded therein to illustrate a process for polishing the ferrules to obtain flat surfaces in order to control the pass and rejection bands of the tunable filter device of FIG. 5A, FIG. 5C.

FIGS. 7A, 7B are cross-sectional views of a ferrule to illustrate the process for setting the distance between the two optical fibers contained in the ferrule in the embodiment of FIG. 5A, FIG. 5D.

FIG. 8A shows a multi-channel wavelength division demultiplexer achieved by varying the radial displacements of multiple fibers using the tunable filter of FIG. 3.

FIG. 8B is a cross-sectional view of device 800 along the line 8B—8B in FIG. 8A.

FIG. 9 shows a multi-channel wavelength division multiplexer achieved by varying the radial displacements of multiple fibers using the tunable filter of FIG. 3.

FIG. 10A shows a cross-sectional view of a tunable filter device in a demultiplexer for decoupling different spectral components, where such device is similar in construction to that in FIG. 4A but modified by including more fibers at the same distance from the GRIN lens axis, where the view is along the line of 4B—4B in such modified FIG. 4A.

FIG. 10B is a cross-sectional view of the tunable filter device of FIG. 10A at a different portion of the device than FIG. 10A.

For convenience and description, identical components at different figures of this application are identified by the same numerals.

DETAILED DESCRIPTION OF THE PREFERRED EMBODIMENT

FIG. 1 is a schematic view of a filter having a characteristic property that the filter passes incident spectral components of wavelengths within a characteristic wavelength band and reflects incident spectral components of wavelengths outside the band. In the preferred embodiment, the filter may be a thin film interference filter. As shown in FIG. 1, an incident beam 11 carrying spectral components of different wavelengths strikes a filter 10. The spectral component having a wavelength in the characteristic band of the filter passes straight through the filter 10 as indicated by the beam 12, and that with a wavelength outside the characteristic band is reflected as indicated by 13. The line 20 is the normal line of the filter, defined by a line that is normal or perpendicular to the filter 10. The incident angle is defined as the angle between the incident beam 11 and the normal line 20. As is known to those skilled in the art, many filters have characteristic wavelength bands that vary with the incidence angle of the incident light. An interference type filter has such characteristic. Such property is illustrated in FIG. 1. If $\lambda_0$ is the center wavelength of light that is passed by the filter 10 at zero angle of incidence (that is, when light is directed to the filter along direction 20), then the center wavelength $\lambda_\theta$ of the characteristic wavelength band of incident light at angle of incidence of $\theta$ is given by the following equation:

$$\lambda_\theta = \lambda_0 (1 - a\sin^2\theta)^{1/2}$$

where a is the coefficient related to the effective refractive index of thin film in the thin film interference filter 10.

Among many others, two possible types of interference filters may be used in the preferred embodiment of the invention. FIGS. 2A, 2B illustrate one of the two types, namely, the properties of a bandpass filter as used in this invention. FIG. 2A is a schematic view of the optical arrangement in FIG. 1, with an input beam 26 having spectral components at wavelengths $\lambda_1, \lambda_2, \lambda_m, \lambda_{m+1}, \ldots, \lambda_n$. Filter 20 may be a bandpass filter having the characteristic property shown in FIG. 2B. As shown in FIG. 2B, spectral components of wavelengths $\lambda_m$ and $\lambda_{m+1}$ are within the pass band while spectral components of the remaining wavelengths in the input beam are in the rejection band. It should be noted in FIG. 2B that the transmission intensities of the passband and the rejection band are on different scales, so that the transmission intensity for the rejection band is not shown to be higher than that for the passband for the same wavelength. The same is true for FIG. 2D described below. Therefore, only light of wavelengths $\lambda_m$, $\lambda_{m+1}$ are passed by filter 20, while light of the remaining wavelengths in the input beam are reflected by the filter as a reflected beam 32. Therefore, by collecting light of the remaining wavelengths in the input beam by means of other optical equipment, it is possible to demultiplex and separate the spectral components of wavelengths $\lambda_m, \lambda_{m+1}$ from the spectral components of the remaining wavelengths in the input beam. Thus, if the input beam in input optical fiber 26 contains spectral components of only two wavelengths (such as $\lambda_m$ and $\lambda_1$) where one wavelength $\lambda_m$ is in the pass band and the other $\lambda_1$ in the rejection band of filter 20, then light of wavelength $\lambda_m$ will pass through filter 20 as output beam 28, whereas light of wavelength $\lambda_1$ will be reflected by filter 20 along path 32 and be collected as another output beam.

As will be illustrated below, if the input beam contains spectral components of more than two wavelengths, and where it is desirable to separate each spectral component from all other components, spectral components that have not been separated by the process described above will need to be again directed towards filter 20 or another filter with similar characteristic properties to separate the components.

FIG. 2c is a simplified schematic view of the arrangement of FIG. 1 where filter 20' employed is a long-pass edge filter with pass and rejection bands as illustrated in the graphical illustration of FIG. 2D. In the case of the edge filter 20', and as illustrated in FIG. 2D, spectral components of wavelengths $\lambda_{m+1}, \ldots, \lambda_n$ are in the pass band while spectral components of the remaining wavelengths in the input beam $\lambda$ through $\lambda_m$ are in the rejection band, so that only spectral components in the pass band will pass through filter 20' and be collimated and collected by an output optical path 28' whereas spectral components of the remaining wavelengths $\lambda_1$ through $\lambda_m$ are reflected by filter 20' and can be collected as a reflected beam 34. As in the case of the bandpass filter 20 in FIGS. 2A, 2B, if the input beam contains only two spectral components, and if one is in the pass band while the other is in the rejection band, then directing the input beam at filter 20' once is adequate to separate spectral components into an output beam in output path 28 and the reflected beam 34. If the input beam contains more than two spectral components, it will be necessary to direct spectral components that have not been separated by such process to filter 20' or a different filter as described below to further separate and demultiplex light of such wavelengths.

As shown in FIG. 2A, the angle of incidence of input beam 26 is at a non-zero angle to the normal direction 30. This means that the characteristic wavelength band of filter 20 and its center wavelength $\lambda_\theta$ in the equation above has been shifted to the left relative to the characteristic wavelength band of filter 20 and center wavelength $\lambda_0$ when the angle of incidence is zero; that is, the pass and rejection bands of filter 20 covers now a range of wavelengths that are shifted compared to the range corresponding to a zero angle of incidence. In FIG. 2B, the pass and rejection bands at zero angle of incidence are shown in dotted lines, whereas the pass and rejection bands at the angle of incidence illustrated in FIG. 2A are shown in solid lines. From FIG. 2B, it will be apparent that what would be passed at normal angle of incidence would now be rejected and specularly reflected by the filter where the angle of incidence is not zero as illustrated in FIG. 2A. Therefore, by choosing the angle of incidence, it is possible to selectively pass a spectral component of one wavelength while selectively reflecting spectral components of other wavelengths. The same is true for the long-pass edge filter 20' of FIGS. 2C, 2D, except that a transition wavelength may be defined in place of the center wavelength in the equation above, where the transition wavelength may be defined as the wavelength where the amplitude transmitted by the filter changes by more than a certain percentage, such as by more than 3 dB, for example.

FIG. 3 illustrates how a Gradient index (GRIN) lens may be used in conjunction with the filter of FIGS. 2A, 2C to form a tunable filter 300 for multiplexing and demultiplexing spectral components. The GRIN lens 301 has a geometrical and optical center axis 305. The lens 301 has two surfaces 307 and 308 perpendicular to the center axis 305. A incident ray 303 parallel but at an offset distance r to the center axis 305 strikes the surface 307. Due to a quasiparabolic index distribution with the maximum index in the center of the GRIN lens 301, the ray 303 is bent toward the center and hits the surface 308 at point P with an angle $\theta_L$. It is important to know that the impinging angle $\theta_L$ varies linearly with the displacement r from the center axis 305. If a quarter pitch GRIN lens is used, $\theta_L = A^{1/2} \cdot r$, where $A^{1/2}$ is an index gradient constant that can be obtained from the SELFOC® Product Guide of NSG America, Inc., located in Somerset, N.J.

Without generally changing the above described physical property of the tunable filter 300, the surface 307 can be tilted with a small angle with respect to the center axis 305 to reduce back reflection. $\theta_a$ is the propagation angle of the ray 304 in the other medium as it emerges as the transmitted beam 324 from the GRIN lens 301. The relation between $\theta_L$ and $\theta_a$ obeys the Snell law. In general the point P 308 is displaced off the center axis 305 unless the length of the GRIN lens 301 is quarter pitch. Thin film interference coating 309 either abuts or may be directly applied to the surface 308 of the GRIN lens 301. The spectral component outside the characteristic band of the filter 309 that is reflected at the filter 309 is indicated by the ray 315. As stated above, the characteristic pass band varies with the impinging angle $\theta_L$, which also varies with the radial displacement r. This invention is based on the observation that a wavelength-adjustable multiplexer and demultiplexer using the filter 300 may be constructed by this property.

FIG. 4 illustrates a demultiplexer with the capability of adjusting the passband wavelengths. Two optical fibers, 401 and 402, are embedded inside two ferrules, 407 and 408, respectively. GRIN lens 410 has a diameter ranging from 1.0 mm to 4.5 mm, which is commercially available from NSG America, Inc. of Somerset, N.J. 08873. The first fiber 401 carries spectral components of multiple wavelengths, $\lambda_1$, $\lambda_2, \ldots, \lambda_n$. The end surfaces, 411, 403 and 404 of the GRIN lens 410 and two ferrules 407 and 408, respectively, are slightly slanted relative to axis 450 of the lens and the optical paths to reduce backreflection. The optical fiber 401 is substantially parallel to, and radially displaced with an adjustable distance $r_1$ from the center line or axis 450 of the GRIN lens 410. The optical beam 431 emerging from the fiber 401 is collimated by the GRIN lens 410 and becomes a parallel beam as it strikes the surface 412 at an angle $\theta_L$. The appropriate incident angle is chosen to pass one or more spectral components in the beam 431 by adjusting the radial displacement $r_1$. The relation of $\theta_L$ and $r_1$ is given above in reference to the description of the filter 300 in FIG. 3. A glass substrate 420 with an interference coating 421 can be either kept in the air (e.g. by a tubing, not shown) or connected to lens 410 by bonding optical cement. For the purpose of illustrating the bandpass feature of the filter coating 412, the filter coating 421 allows the spectral component of wavelength $\lambda_1$ carried in the beam 431 to pass and reflects the remaining spectral components of wavelengths $\lambda_2, \ldots, \lambda_n$. The second fiber 402 substantially parallel to axis 450 is optically aligned to pick up the reflected components at $\lambda_2, \ldots, \lambda_n$, which are focused by the GRIN lens 410 to fiber 402. The radial displacement of the second fiber is marked as $r_2$. In many instances, $r_2$ is close to or equal to $r_1$. The transmitted beam 433 through the filter coating 421 is focused by a second GRIN lens 441 and then enters a third fiber 461, which is embedded in a third ferrule 462.

If it is desirable to further separate the spectral components at wavelengths $\lambda_2, \ldots, \lambda_n$, then the spectral components carried by optical fiber 402 would be redirected towards coating 421 at an angle different from $\theta_L$ or a different filter having the characteristic frequency different from that experienced by beam 431. This is shown in FIG. 8 below. FIG. 4B is a cross-sectional view of the two ferrules 407, 408 along the line 4B—4B in FIG. 4A.

The same tunable device 400 may also be used to multiplex the spectral components carried along two different input optical paths as shown in FIG. 4C. As shown in FIG. 4C, in order to multiplex rather than demultiplex, one simply reverses the directions of the optical paths from those in FIG. 4A to obtain those in FIG. 4C. As shown in FIG. 4C, spectral components at wavelengths $\lambda_2, \ldots, \lambda_n$, are supplied to optical fiber 402 which then serves as an input optical path. Spectral component $\lambda_1$ is applied to fiber 461 which then serves as a second input optical path. The spectral component at $\lambda_1$ is then collimated by GRIN lens 441 and as beam 433' which passes through the filter coating 421 and is focused by GRIN lens 410 to fiber 401. The spectral components at wavelengths $\lambda_2, \ldots, \lambda_n$, carried by fiber 402 are collimated by GRIN lens 410 and then reflected by coating 421 where said reflection is focused by lens 410 to fiber 401, so that the output optical fiber 401 now carries the spectral components at wavelengths $\lambda_1, \lambda_2, \ldots, \lambda_n$. To further multiplex additional spectral components at other wavelengths to the optical signal carried by fiber 401, the output signal carried by fiber 401 may be directed towards the same coating 421 at a different angle than $\theta_L$ or towards a filter having a different passband experienced by beam 433', along with other spectral components carried along an additional input optical path for additional multiplexing. This is illustrated in reference to FIG. 9 below.

FIG. 5A is a cross-sectional view of a multiplexer/demultiplexer arrangement to illustrate the preferred embodiment of the invention. The embodiment in FIG. 5A is substantially the same as arrangement 400 in FIGS. 4A, 4C, except that the two optical fibers 401, 402 are placed in one or more ferrules that are designed for convenient and easy selection of the pass and rejection bands of the filter coating 421. FIGS. 5B, 5C, 5D are cross-sectional views of the arrangement of FIG. 5A along the line (5B, 5C, 5D)—(5B, 5C, 5D) in FIG. 5A. As shown in FIGS. 5A and 5B, the two optical fibers 401 and 402 have been encapsulated in a single ferrule 501 having a center 501a. The two fibers 401, 402 are so encapsulated that the center axis 501a is substantially at the midpoint between the two fibers so that each fiber is at a distance r from axis 501a, where r is selected so that filter coating 421 would pass the spectral component at wavelength $\lambda_1$ but would reflect the spectral components at wavelengths $\lambda_2, \ldots, \lambda_n$. A collection of ferrules similar to ferrules 500 may be provided with different values for r and therefore different values for the pass and rejection bands for coating 421. When it is desirable to change the pass band and rejection band characteristics effected by coating 421, the user would simply select the ferrule having the desired value for r, corresponding to a value for the incident angle $\theta_L$ in FIG. 4A.

The ferrule and optical fiber arrangement 500' in FIG. 5C illustrates another possible arrangement for conveniently selecting the pass and rejection band characteristics of coating 421. Instead of encapsulating the two fibers in a single ferrule, the two fibers may be capsulated into separate ferrules. But the two ferrules are polished so that each has a flat surface at a selected distance r to the respective optical fiber as seen in FIG. 5C. Thus, the pass and rejection band characteristic of the coating 421 may be controlled by the amount of polishing of the two ferrules 511, 512 to the desired r value.

Yet another possible variation is illustrated in FIG. 5D. As shown in FIG. 5D, the ferrule optical fiber arrangement 500" includes a single ferrule 521 with an elongated cavity having a flat cross-section as shown in FIG. 5D therein for holding the two fibers 401, 402. The positions of the two fibers relative to the center axis 450 of the GRIN lens 410 may be set by using the appropriate spacers 523, 525 in order to select the desired pass band and rejection band characteristics of coating 421.

FIGS. 6A, 6B, 6C are cross-sectional views of two ferrules each containing an optical fiber 401, 402 to illustrate the polishing process for making the ferrule-optical fiber arrangement 500' of FIG. 5C. As shown in FIG. 6A, one would first start out with two cylindrical ferrules 511a, 512a having embedded therein fibers 401, 402 respectively at the centers of the two ferrules. As shown in FIG. 6B each of the two ferrules is polished where ferrule 511 is polished so that its flat surface 511' is at a distance d1 to fiber 401 whereas the flat surface 512' is at a distance d2 to fiber 402. The flat surfaces of the two fibers are then attached together by suitable means such as optical cement or epoxy to form the ferrules-optical fiber structure 500'.

FIGS. 7A, 7B are cross-sectional views illustrating a process for making the ferrule-optical fiber arrangement 500" of FIG. 5D. First a ferrule 521 having center axis 521a and an elongated cavity with a flat cross-section therein is provided as shown in FIG. 7A. As shown in FIG. 7A, the cavity 530 need not be symmetrically placed so that one edge of it may be closer to the ferrule surface than the other. The two fibers 401, 402 and appropriate spacers 523, 525 are then placed so that fiber 401 could be aligned to be a distance d4 from center axis 521a and fiber 402 may be at a distance d3 from axis 521a.

FIG. 8A shows a multi-channel wavelength division demultiplexer achieved by varying the radial displacements of a multiple of fibers. Four input fibers, 801, 802, 803 and 804 are embedded in a ferrule 821. The radial displacement of each input fiber is predetermined by the desired incident angle to the filter coating 832. A spectral component at a specific wavelength carried in each fiber is allowed to pass the filter coating 832. The filter coating 832 is applied to a surface of glass substrate 831. The filter element 831 is bonded by cement or with a air gap against a surface of the GRIN lens 830. In FIG. 8A, a four channel wavelength division demultiplexer is illustrated as an example. A demultiplexer with more or fewer channels is within the scope of the present invention.

FIG. 8B is a cross-sectional view of device 800 along the line 8B—8B in FIG. 8A. As shown in FIGS. 8A, 8B, the ferrule-optical fiber arrangement used is similar to that in FIG. 5C, except that each ferrule contains more than one fiber. The fiber 801 carrying four wavelengths, $\lambda_1$, $\lambda_2$, $\lambda_3$, and $\lambda_4$ is launched to the GRIN lens 830 at the radial displacement of $r_1$, from the center axis or line 833 of the GRIN lens 830. The optical beam emerging from the fiber 801 is collimated by the GRIN lens 830 and then strikes the filter 832 at an incident angle of $\theta_1$ (not shown). A spectral component at a wavelength corresponding to angle $\theta_1$, saying $\lambda_1$, is allowed to pass the filter 832 and focused by the other GRIN lens 832 to the fiber 811. The remaining three wavelengths, $\lambda_2$, $\lambda_3$, and $\lambda_4$ outside the pass band are reflected at the filter 832 and focused back to the fiber 806. The output end 806a of the fiber 806 is connected at 841 to the input end 802a of the fiber 802. The fiber 802 is displaced by $r_2$ off the center line 833. The optical beam emerging from the fiber 802 therefore strikes the filter 832 at an angle $\theta_2$ such that the spectral component at $\lambda_2$ passes the filter and is focused by the GRIN lens 832 to the fiber 812. The remaining two wavelengths $\lambda_3$, and $\lambda_4$ are reflected at the filter 832 and refocused to a fiber 807. Accordingly, these two wavelengths are circulated as described above for $\lambda_1$ and $\lambda_2$ as the last loop until the spectral components $\lambda_3$, and $\lambda_4$ enter the fibers 813 and 814, respectively.

If the directions of the optical signals in device 800 of FIG. 8A are reversed from those shown in FIG. 8A, the device becomes a multi-channel multiplexer, as shown in FIG. 9.

In the embodiments of FIGS. 8A, 8B, 9 above, the four optical fibers 801, 802, 803, 804 are used to carry spectral components of different wavelengths. This is not required by the invention, and the fibers can be arranged to carry spectral components of the same wavelength in a modified FIG. 4A, and as shown in FIGS. 10A, 10B, which are cross-sectional views of such modified FIG. 4A. As indicated in FIG. 4A, the index of refraction of the GRIN lenses 410 and 441 is axially symmetrical with respect to the common center line or axis 450. By this axial symmetry characteristic, it is possible to employ multiple optical paths carrying spectral components of the same wavelength using the same GRIN lenses. Thus FIG. 4A needs to be modified to include another pair of fibers near lens 410 to carry the input optical signal towards filter 421, and carry an output optical signal reflected from the filter and another fiber near lens 441 to carry an output signal that has passed through the filter. FIG. 10A shows a cross-sectional view along the line of 4B—4B in such modified FIG. 4A. Ferrule 910 has imbedded therein four fibers 901A, 901B, 902A and 902B located substantially in the same circle 912 with radius r from axis 450 of the lenses 410, 441. Fibers 901A and 901B are located on the opposite sides of the circle. So are 902A and 902B. Because of the axial symmetry characteristic of the GRIN lens 410, the optical signals carried by the fiber 901A and reflected at the filter 421 are coupled back to the fiber 901B through the GRIN lens 410. The same coupling relation is also applicable between the fiber pair 902A and 902B. It is clear that the incident angles on the filter 421 for the optical beams from the fiber 901A and 902A are substantially the same so that the filter would have the same characteristic wavelength band for both beams, and so that spectral components within the same pass band of the filter would pass the filter and those outside would be reflected from both beams. The signal carried by the fiber 901A and passed by the filter 421 is collected by a fiber 901C as indicated in FIG. 10B. Similarly, the fiber 902C is used to collect the signals that has passed through the filter 421 from the fiber 902A. Fiber 901C and 902C are located substantially in the same circle 915 in ferrule 911.

Obviously, more fiber pairs similar to 901A, 901B and 902A, 902B can be added to the circle 912 in ferrule 910, and fibers 901C, 902C added to circle 915 in ferrule 911 for carrying additional optical signals with spectral components that will encounter the same characteristic wavelength band of filter 421.

While the invention has been described above by reference to various embodiments, changes and modifications may be made without departing from the scope of the invention which is to be limited only by depending claims and their equivalents.

What is claimed is:

1. An adjustable optical filter device, comprising:
    a filter having a characteristic property that the filter passes incident light of wavelengths within a characteristic wavelength band and reflect incident light of wavelengths outside said characteristic wavelength band, wherein said characteristic wavelength band varies with the angle of incidence of said incident light to the normal direction to the filter;
    a first GRIN lens having, an axis, and
    means for directing a first input optical signal having one or more spectral components alone a first input optical path substantially parallel to said axis incident on the first GRIN lens at a distance from the axis, said lens transmitting the first input optical signal in the input path towards the filter, said distance being such that at least a first spectral component in the first input optical signal transmitted by the lens is passed or reflected by the filter.

2. The device of claim 1, said device used in a demultiplexer arrangement, wherein at least another spectral component other than the at least first spectral component in the input signal is reflected or passed by the filter.

3. The device of claim 2, further comprising:
    a first output optical path receiving the portion of the first input optical signal reflected by the filter and transmitted through the lens: and
    a second output optical path receiving the portion of the first input optical signal that is passed by the filter.

4. The device of claim 3, said second output optical path including a second GRIN lens and an output optical fiber, said second GRIN lens focusing the portion of the first input optical signal that is passed by the filter to the output optical fiber.

5. The device of claim 3, said directing means including a ferrule with at least one pair of optical fibers therein to serve as the first input optical path and the first output optical path.

6. The device of claim 5, said ferrule containing a plurality of pairs of optical fibers at the same or different separation distances between corresponding pairs for demultiplexing a plurality of spectral components in the first input optical signal.

7. The device of claim 1, said device used in a multiplexer arrangement, wherein said device further comprises:
    an output optical path;
    a second GRIN lens on a side of the filter opposite to the first GRIN lens, said second GRIN lens having an axis substantially parallel to that of the first GRIN lens;
    said directing means also directing along a second input optical path substantially parallel to the axes of the GRIN lenses a second input optical signal having one or more spectral components through the second GRIN lens towards the filter, wherein the first and second input optical signals are focused by the lenses towards opposite sides of a portion of the filter, said directing means selecting distance of the second input optical path to one of the axes so that at least one selected second spectral component of the second input optical signal is passed by the filter to the output optical path, wherein the at least first spectral component of said first input optical signal is reflected by the filter to said output optical path.

8. The device of claim 7, said directing means including a ferrule with at least one pair of optical fibers therein to serve as the first input optical path and the output optical path.

9. The device of claim 8, said ferrule containing a plurality of pairs of optical fibers at the same or different separation distances between corresponding pairs for multiplexing a plurality of spectral components from a plurality of input optical paths to said output optical path.

10. The device of claim 1, said directing means including a ferrule with at least one pair of optical fibers therein, said at least one pair of fibers being separated by about twice said distance.

11. The device of claim 10, said at least one pair of fibers being contained in a cavity in the ferrule, said selecting means further comprising a spacer separating said fibers so that the fibers in said at least one pair of fibers are separated by about twice said distance.

12. The device of claim 1, said directing means including at least one pair of ferrules each containing an optical fiber, each ferrule in the at least one pair of ferrules having a substantially flat surface, wherein the separation between the substantially flat surface and the fiber of each ferrule in the at least one pair of ferrules is substantially equal to said distance.

13. The device of claim 1, said directing means including means for altering said distance to select a desired spectral component in the first input signal that is passed by the filter.

14. A method for optical coupling, comprising the steps of:
    providing a filter having a characteristic property that the filter passes incident light of wavelengths within a characteristic wavelength band and reflect incident light of wavelengths outside said characteristic wavelength band, wherein said characteristic wavelength band varies with the angle of incidence of said incident light to the normal direction to the filter; and a GRIN lens having an axis; and
    directing an input optical signal having at least one spectral component along an input optical path substantially parallel to said axis incident on the GRIN lens at a distance from the axis so that said lens transmits the input optical signal towards the filter, said directing step also selecting said distance so that said at least one spectral component is passed or reflected by the filter.

15. The method of claim 14, said directing step including:
    providing a plurality of ferrules, each with at least one pair of optical fibers therein, said at least one pair of fibers being separated by a distance, said distance being different for at least two of said ferrules; and
    selecting one of the ferrules and an optical fiber in the selected ferrule to be the input optical path and the other fiber of said selected ferrule to be an output optical path, the distance between the at least one pair of fibers in said selected ferrule being such that said at least one spectral component is passed or reflected by the filter towards the output optical path.

16. The method of claim 14, said directing step including:

providing a ferrule with at least one pair of optical fibers therein, said at least one pair being contained in a cavity in the ferrule, and a plurality of different spacers each adapted to be placed between the fibers for setting the distance between the fibers;

placing one of said spacers between the at least one pair of optical fibers, said spacer placed being of such dimensions that when one optical fiber of the at least one pair is used as the input optical path and the other fiber used as an output optical path, the at least one spectral component is passed or reflected by the filter towards the output optical path.

17. The method of claim 14, said directing step including:

providing at least one pair of ferrules each containing an optical fiber; and causing each of said at least one pair of ferrules to have a substantially flat surface, and the flat surfaces of said at least one pair to abut;

using the optical fiber in said at least one pair of ferrules to be the input optical path and the fiber in the other of said at least one pair of ferrules to be an output optical path, wherein the causing step causes the separation between the substantially flat surface and the fiber of each of said at least one pair of ferrules to be such that said at least one spectral component is passed or reflected by the filter to the output optical path.

18. A multiplexer/demultiplexer device, comprising:

a filter having a characteristic property that the filter passes incident light of wavelengths within a characteristic wavelength band and reflect incident light of wavelengths outside said characteristic wavelength band, wherein said characteristic wavelength band varies with the angle of incidence of said incident light to the normal direction to the filter;

a first GRIN lens having an axis and adjacent to the filter;

a first group of one or more input/output optical paths on a first side of the lens and filter and a second group of one or more input/output optical paths on a second side of the lens and filter; and an optical route through the lens and filter, said route being at an angle different from 90° to the filter, said route substantially parallel to said axis at a distance from the axis and connecting an optical path in the first group to an optical path in the second group.

19. The device of claim 18, further including a second GRIN lens between the filter and the first or the second group of optical paths for focusing or collimating optical signals between the filter and such group.

20. The device of claim 18, further including a ferrule with at least one pair of optical fibers therein to serve as the first or the second group of optical paths.

21. The device of claim 20, said ferrule containing a plurality of pairs of optical fibers at the same or different distances from the axis for multiplexing or demultiplexing a plurality of spectral optical components.

* * * * *